G. W. EASTMAN.
APPARATUS FOR INTRODUCING LIQUID INTO VEINS.
APPLICATION FILED DEC. 22, 1913.
1,170,805.
Patented Feb. 8, 1916.
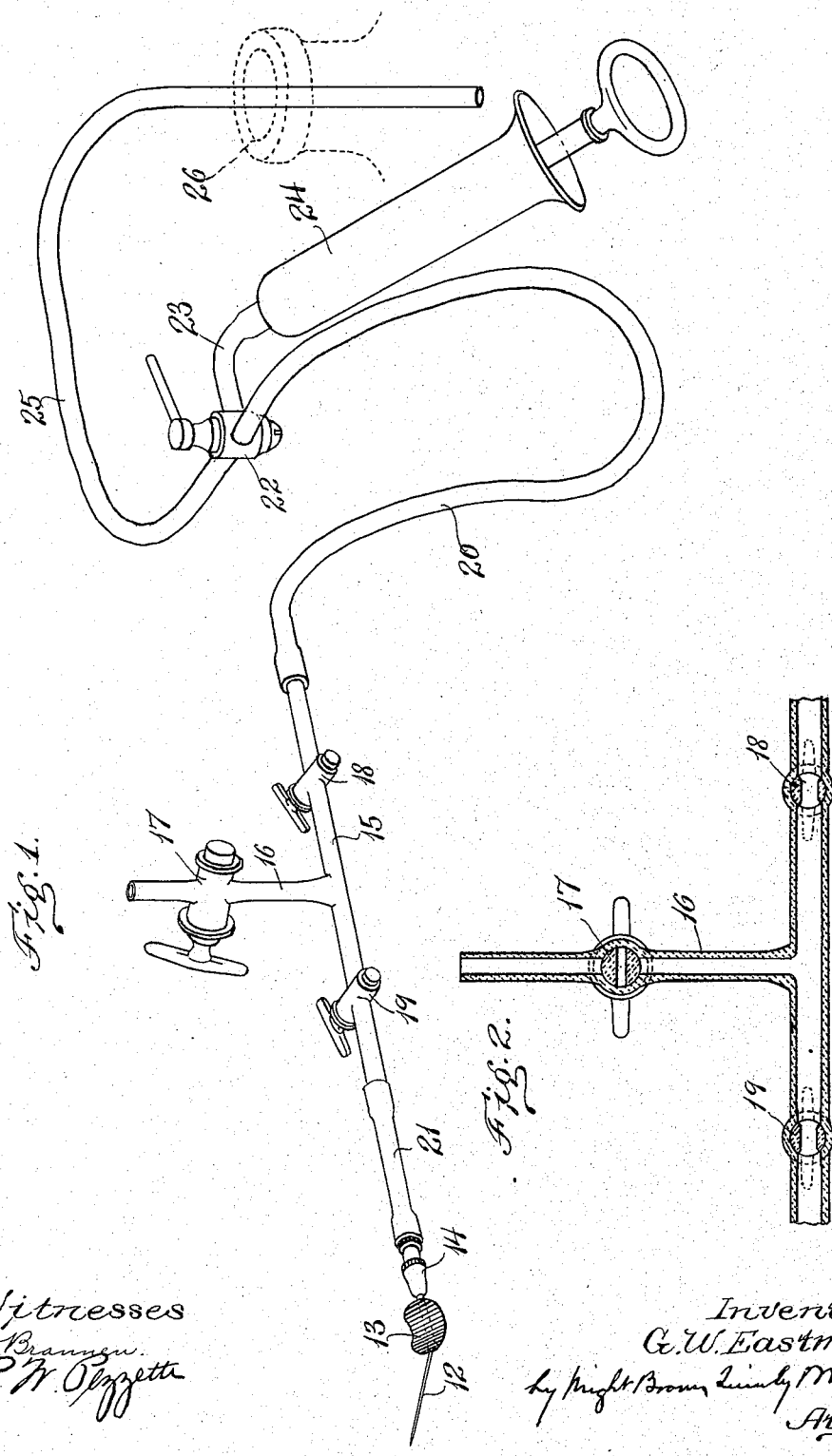
Witnesses
Inventor:
G. W. Eastman

UNITED STATES PATENT OFFICE.

GEORGE WARREN EASTMAN, OF LYNN, MASSACHUSETTS.

APPARATUS FOR INTRODUCING LIQUID INTO VEINS.

1,170,805.  Specification of Letters Patent.  Patented Feb. 8, 1916.

Application filed December 22, 1913. Serial No. 808,105.

*To all whom it may concern:*

Be it known that I, GEORGE WARREN EASTMAN, a citizen of the United States, and a resident of Lynn, in the county of Essex and State of Massachusetts, have invented certain new and useful Improvements in Apparatus for Introducing Liquid into Veins, of which the following is a specification.

This invention relates to apparatus for introducing a liquid into a vein of the circulatory system of a human body, the liquid being either a remedial hypodermic forced under pressure by a syringe or pump, or blood transfused directly from one body to another.

The object of the invention is to prevent the introduction of air with the liquid and the well known serious results attending the introduction of air.

The invention consists in the improvements which I will now proceed to describe and claim.

Of the accompanying drawings,—Figure 1 represents a perspective view of an apparatus embodying my invention. Fig. 2 represents a longitudinal section of the transparent conduit portion hereinafter described.

The same reference characters indicate the same parts in all the figures.

In the drawings,—12 represents a hypodermic needle of common construction, the base of the needle being usually provided with a thumb or finger rest 13. The hub 14 of the needle is connected with a tubular conduit communicating with the lumen of the needle and adapted to conduct liquid thereto. A portion 15 of said conduit is made of glass or other transparent material, so that air bubbles passing through the conduit to the needle are visible in the portion 15. The glass portion 15 is provided between its ends with a lateral branch 16 preferably of the same material, said branch when held vertically constituting an air chamber adapted to trap air passing through the portion 15, the trapped air being therefore prevented from passing to the needle 12. The branch 16 is preferably provided with a stop cock 17 adapted to liberate the trapped air. I also prefer to provide the portion 15 with stop cocks 18 and 19 at opposite sides of the branch or air chamber 16, these stop cocks enabling the operator to more carefully guard against the possibility of air passing through the portion 15 to the needle. As here shown, the conduit includes flexible portions 20 and 21, which may be lengths of rubber tubing, the portion 20 connecting one end of the glass portion 15 with a three-way cock 22, while the portion 21 connects the opposite end of the glass portion with the hub of the needle 12. When liquid is to be injected into a vein by a mechanical pressure, the three-way cock 22 is connected by a tube 23 with a syringe barrel 24 and the casing of the three-way cock is connected by a flexible tube 25 with a receptacle 26 containing a supply of the liquid to be injected.

In operating the apparatus shown, the cock 22 is first adjusted to enable liquid to be drawn from the receptacle 26 into the barrel 24, and is then adjusted to cause liquid to pass from the barrel 24 through the conduit portions 20, 15 and 21 to the needle. While the apparatus is in use the cocks 18 and 19 remain open, and the cock 17, closed. As the fluid passes the branch 16 any air or gases occluded within the fluid is trapped by said branch, passing upwardly thereinto. Should it be desired to permit the discharge of the trapped air or gas, the operation may be arrested long enough to close cock 19 and open cock 17, whereupon the pressure in conduit 15 will expel any air or gas within the branch 16. By again closing cock 17 and opening cock 19 the operation of the apparatus may continue.

The glass conduit portion 15 with its air chamber may be a part of an apparatus adapted to be used in the direct transfusion of blood from one human body to another, in which case the syringe and the three-way cock will be omitted.

I claim:—

1. An apparatus for introducing liquid into the veins, comprising a hypodermic needle, a conduit communicating with the lumen of said needle and provided with a laterally extended branch forming an air chamber to trap any air that may be occluded within the liquid, said branch being open at its outer end and provided with means for permitting escape of the trapped air when desired, and means on both sides of said branch to interrupt the flow of said fluid when the trapped air is permitted to escape.

2. An apparatus for introducing liquid into the veins, comprising a hypodermic needle, a conduit communicating with the lumen of said needle and provided with a transparent portion having a laterally extended branch forming an air chamber to trap any air that may be occluded within the liquid, said branch being open at its outer end, a cock for controlling the open end of said branch for permitting escape of the trapped air when desired, and cocks located at the opposite ends of said transparent portion to interrupt the flow of fluid when the trapped air is permitted to escape.

In testimony whereof I have affixed my signature, in presence of two witnesses.

GEORGE WARREN EASTMAN.

Witnesses:
RUDOLPH W. CURRIER,
GEORGE I. DODD.

Copies of this patent may be obtained for five cents each, by addressing the "Commissioner of Patents, Washington, D. C."